United States Patent

Matsubara

[11] 4,106,584
[45] Aug. 15, 1978

[54] VEHICLE SPEED CONTROL SYSTEM

[75] Inventor: Hiroshi Matsubara, Matsuyama, Japan

[73] Assignee: Diesel Kiki Co., Ltd., Tokyo, Japan

[21] Appl. No.: 746,261

[22] Filed: Nov. 30, 1976

[30] Foreign Application Priority Data

| Dec. 5, 1975 | [JP] | Japan | 50-164903[U] |
| Dec. 5, 1975 | [JP] | Japan | 50-164904[U] |
| Dec. 5, 1975 | [JP] | Japan | 50-164905[U] |

[51] Int. Cl.² ............................................. B60K 31/00
[52] U.S. Cl. ............................. 180/105 E; 123/97 B; 123/102; 180/108; 188/273
[58] Field of Search ................. 180/105 E, 108, 109, 180/110; 123/97 B, 102, 107, 111, 103 R; 188/272, 273; 192/3 G, 3 TR

[56] References Cited

U.S. PATENT DOCUMENTS

| 2,895,571 | 7/1959 | Hanebeck | 123/97 B |
| 2,924,205 | 2/1960 | Williams | 123/97 B |
| 3,087,340 | 4/1963 | McMurray et al. | 180/108 |
| 3,392,799 | 7/1968 | Ishikawa | 123/102 |
| 3,590,938 | 7/1971 | Gurol | 180/109 X |
| 3,774,715 | 11/1973 | Matsubara | 123/102 X |
| 3,960,122 | 6/1976 | Perrin | 123/97 B |

Primary Examiner—Joseph F. Peters, Jr.
Assistant Examiner—Donn McGiehan
Attorney, Agent, or Firm—Frank J. Jordan

[57] ABSTRACT

A vehicle speed sensor is connected to a fluid pressure source such as the engine intake manifold and produces a pressure output corresponding to vehicle speed. An actuator in the form of a diaphragm assembly positions the engine fuel control member in accordance with the pressure output of the speed sensor so as to decrease the amount of fuel for combustion as the vehicle speed increases and vice-versa so that the vehicle speed is maintained at a predetermined value regardless of vehicle load. A normally open exhaust brake valve is provided in the engine exhaust system and is automatically closed to block the exhaust system and thereby brake the engine when the speed control system is energized and the fuel control member is moved by the actuator to a minimum fuel demand position. This condition occurs when the vehicle is rolling downhill or the like and the vehicle speed cannot be limited to the predetermined value by fuel control alone. Various switches are provided to automatically de-energize the speed control system when the operator depresses a brake pedal, a clutch pedal, a manual exhaust brake switch and when the vehicle speed exceeds the predetermined value by a predetermined amount.

13 Claims, 6 Drawing Figures

VEHICLE SPEED CONTROL SYSTEM

BACKGROUND OF THE INVENTION

The present invention relates to an automatic speed control system for a motor vehicle.

More specifically, the present invention provides necessary and substantial improvement to the type of vehicle speed control system disclosed in U.S. Pat. No. 3,441,104. The system comprises a speed sensor or transducer which modulates intake manifold vacuum in accordance with vehicle speed to produce an output pressure which directly corresponds to the vehicle speed. This pressure is applied to a diaphragm assembly which controls the engine fuel control member. When the vehicle speed increases the amount of fuel for combustion is decreased and vice-versa so that the vehicle is controlled to move at a predetermined speed regardless of vehicle load.

Whereas the system operates effectively under mild driving conditions, fuel control alone is not sufficient to limit the vehicle speed to the predetermined value when the vehicle is heavily loaded and moving down a steep grade. In other words, engine braking alone is not sufficient to slow down the vehicle by the required amount. In such a case, the vehicle operator must override the system using the manual brake pedal. However, depression of the brake pedal deenergizes the automatic control system returning the control of the vehicle to the operator entirely. This situation is dangerous since control is returned to the operator under extreme driving conditions after a period of automatic control. It may take as much as a few seconds for the driver to get the feeling of the vehicle under such conditions so that he may respond effectively. During these few seconds control of the vehicle may be lost resulting in a tragic accident.

SUMMARY OF THE INVENTION

It is an important object of the present invention to provide an automatic vehicle speed control system with substantially improved safety features.

It is another object of the present invention to provide a vehicle speed control system which extends the range of effective automatic control over comparable prior art systems.

It is another object of the present invention to provide a vehicle speed control system which incorporates the braking effect of blocking the engine exhaust system.

It is another object of the present invention to provide a vehicle speed control system which maintains the vehicle speed at a predetermined value by means of fuel control under normal driving conditions. The system further automatically detects when fuel control alone is insufficient to limit the vehicle speed to the predetermined value and closes a valve in the exhaust system thereby effecting exhaust braking to slow down the vehicle in response thereto.

It is another object of the present invention to provide a generally improved vehicle speed control system.

Other objects, together with the foregoing, are attained in the embodiments described in the following description and illustrated in the accompanying drawings.

DESCRIPTION OF THE PREFERRED EMBODIMENTS

While the vehicle speed control system of the present invention is susceptible of numerous physical embodiments, depending upon the environment and requirements of use, substantial numbers of the herein shown and described embodiments have been made, tested and used, and all have performed in an eminently satisfactory manner.

Figure 1:
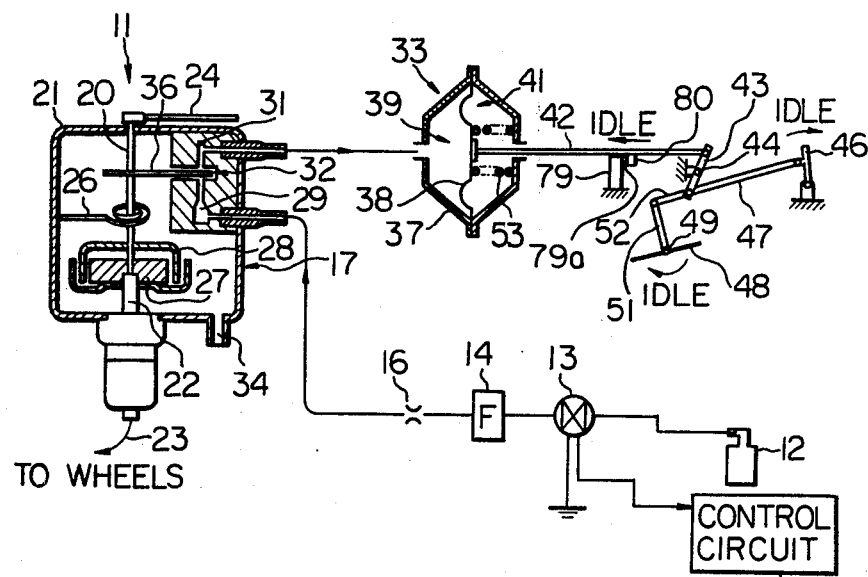
FIG. 1 is a diagrammatic view of a first embodiment of a vehicle speed control system according to the present invention.

Referring now to FIG. 1 of the drawing, an automatic vehicle speed control system embodying the present invention is generally designated by the reference numeral 11. A source 12 of pressurized fluid such as air is shown in the form of a container but may be constituted by an engine supercharger. The source 12 is connected through a control valve 13, a filter 14 and a flow restriction 16 to a speed sensor 17. Whereas the fluid pressure at the source 12 may be on the order of 6-7 kg/cm$^2$, the flow restriction 16 operates to drop the pressure to a constant value of typically 1 kg/cm$^2$. The control valve 13 is of the electrically actuated solenoid type and is selectively opened and closed by means of an electrical control circuit 18 as will be described in detail below.

The speed sensor 17 comprises a casing 21 which rotatably supports therein a shaft 22. The shaft 22 is driven from the vehicle wheels by a cable 23 in the same manner as a conventional speedometer. A second shaft 20 is rotatably supported by the casing 21 in coaxial relation with the shaft 22 but is not physically connected to the shaft 22. The speed sensor 17 may bifunction as a speedometer if a pointer 24 is fixed to the shaft 20 and a scale (not shown) is marked on the upper surface of the casing 21 as viewed in FIG. 1.

A hair spring 26 is connected between the casing 21 wall and the shaft 20 which urges the shaft 20 toward a rest position against a stop which is not shown. A magnet 27 is fixed to the shaft 22 for unitary rotation. A cup 28 made of a magnetically conductive material is fixed to the shaft 20 and coaxially surrounds the magnet 27. Rotation of the shaft 22 and magnet 27 causes eddy currents to be induced in the cup 28 which interact with the field of the magnet 27 in such a manner that a magnetic coupling effect is produced between the magnet 27 and the cup 28 causing the cup 28 to rotate against the force of the spring 26. The equilibruim position of the cup 28, shaft 20 and pointer 24 depends on the magnitude of the induced eddy currents which in turn depends on the rotational speed of the magnet 27. Since the magnet 27 is driven from the vehicle wheels, the position of the shaft 20 is determined by the vehicle speed.

The flow restriction 16 is connected to an inlet orifice 29 of the speed sensor 17. The inlet orifice 29 faces an outlet orifice 31 across a gap 32, the outlet orifice 31 leading to an actuator in the form of a diaphragm assembly 33. The interior of the casing 21 is open to the atmosphere through another outlet orifice 34.

A valve plate 36 is fixed to the shaft 20 for unitary rotation and extends into the gap 32 between the inlet orifice 29 and outlet orifice 31. The radius of the valve plate 36 is not uniform but varies in a predetermined manner according to angular position. The valve plate 36 serves to meter the amount of communication between the inlet orifice 29 and the outlet orifice 31 in accordance with the angular position of the shaft 20 and thereby the vehicle speed. Fluid blocked by the valve plate 36 is discharged from the casing 21 through the outlet orifice 34. In this manner, the more the valve plate 36 blocks communication between the inlet orifice 29 and outlet orifice 31 the lower the pressure at the outlet orifice 31 which is applied to the diaphragm assembly 33.

The contour of the valve plate 36 is selected so that the higher the vehicle speed the greater the degree of blockage of the outlet orifice 31 and the lower the fluid pressure applied to the diaphragm assembly 33.

The diaphragm assembly 33 comprises a casing 37 which is partitioned by a flexible diaphragm 38 into a pressure chamber 39 and a spring chamber 41. Whereas the pressure chamber 39 is airtight and communicates with the outlet orifice 31, the spring chamber 41 is not airtight. An actuator rod 42 is mechanically connected at its left end to the center of the diaphragm 38. At its right end, the actuator rod 42 is pivotally connected to the upper end of a lever 43 which is pivotal about a fixed pin 44.

An accelerator pedal 46 is pivotal about its lower end and is pivotally connected at an intermediate point thereof to the lower end of the lever 43 by means of a link 47. A fuel control member 48 such as a carburetor throttle plate, fuel injection pump control member or the like is pivotally supported about a shaft 49. An arm 51 is fixed to the fuel control member 48 for integral rotation. The end of the arm 51 is pivotally connected to the lower end of the lever 43 through a link 52.

A compression spring 53 is provided in the spring chamber 41 of the diaphragm assembly 33 to urge the diaphragm 38 leftwardly. With substantially atmospheric pressure in the pressure chamber 39, the diaphragm 38 is urged by the spring 53 to a maximum leftward idling or minimum fuel demand position. The actuator rod 42 is also moved leftwardly by the spring 53 causing the lever 43 to pivot counterclockwise about the pin 44. This in turn causes the fuel control member 48 to rotate clockwise and the accelerator pedal 46 to pivot clockwise. In the idling or minimum fuel demand position of the system 11 illustrated in FIG. 1 the accelerator pedal 46 is moved to its undepressed position and the fuel control member 48 is moved to its minimum fuel position. It will be seen that the spring 53 serves both as a diaphragm spring and a throttle return spring.

With the control valve 13 closed and atmospheric pressure applied to the pressure chamber 39, the vehicle speed may be controlled by means of the accelerator pedal 46. To accelerate, the vehicle operator simply depresses the accelerator pedal 46 against the force of the spring 53 causing the fuel control member 48 to rotate counterclockwise thereby increasing the amount of fuel for combustion in the engine. Releasing the accelerator pedal 46 allows the spring 53 to rotate the fuel control member 48 clockwise thereby decreasing the amount of fuel for combustion.

Automatic constant speed drive is accomplished when the control circuit 18 energizes the normally closed control valve 13 to open and communicate the speed sensor 17 with the fluid source 12. As described above, the amount of fluid pressure applied from the outlet orifice 31 to the pressure chamber 39 of the diaphragm assembly 33 depends on the vehicle speed. At zero vehicle speed the pressure is maximum and urges the diaphragm 38 rightwardly against the force of the spring 53. This causes the lever 43 to rotate clockwise and the fuel control member 48 to rotate counterclockwise thereby increasing the amount of fuel for combustion and accelerating the vehicle. As the vehicle approaches the predetermined speed, the pressure in the pressure chamber 39 progressively decreases and the fuel control member 48 is rotated clockwise by the spring 53 to decrease the amount of fuel and thereby the acceleration. When the predetermined speed is reached, the position of the fuel control member 48 is such that the proper amount of fuel is being supplied into the engine to propel the vehicle at the predetermined speed.

If the vehicle speed should drop due to an increase in vehicle load, such as running up a grade, the pressure in the pressure chamber 39 will increase thereby urging the diaphragm 38 rightwardly and increasing the amount of fuel. Conversely, if the vehicle speed increases due to a reduction in vehicle load, such as running down a grade, the pressure in the pressure chamber 39 decreases and the spring 53 moves the diaphragm 38 leftwardly to decrease the amount of fuel.

At any time when the system 11 is in the energized or automatic control mode the operator may manually override the system 11 to increase the vehicle speed above the predetermined value. This is accomplished by merely depressing the accelerator pedal 46 beyond the position in which it is held by the system 11. The magnitude of the pressure in the pressure chamber 39 is low enough that the vehicle operator may overcome the same without undue effort. Releasing the accelerator pedal 46 returns the system 11 to the fully automatic mode.

In the manner described thus far, the system 11 automatically maintains the vehicle speed at a predetermined value regardless of vehicle load and may be manually overriden by the vehicle operator to speed up and pass another vehicle for example by merely depressing the accelerator pedal 46.

Figure 2:
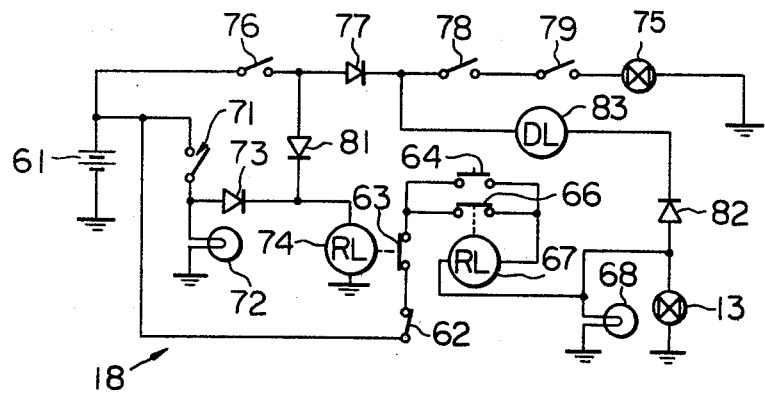
FIG. 2 is an electrical schematic diagram of a control circuit of the speed control system of FIG. 1.

Referring now to FIG. 2, the control circuit 18 comprises a power source symbolically illustrated as a battery 61, the negative terminal of which is grounded. A positive supply voltage is taken from the positive terminal of the battery 61 and is applied through a normally closed clutch switch 62 and normally closed relay contacts 63 to the parallel combination of a normally open set switch 64 and normally open relay contacts 66. From the switch 64 and contacts 66 the circuit leads through a relay coil 67 and a pilot lamp 68 to ground. The control valve 13 is connected in parallel with the pilot lamp 68. The clutch switch 62 is connected to the vehicle clutch pedal (not shown) so as to be opened when the vehicle operator depresses the clutch pedal. The set switch 64 is of the momentary contact type and is depressed to set the system 11 in the automatic control mode. The contacts 66 are latching contacts of the relay coil 67.

With the clutch engaged, the vehicle operator places the system 11 in the automatic control mode by closing the set switch 64 which energizes the relay coil 67 therethrough. Current flow through the relay coil 67 closes the contacts 66 which maintain the circuit through the relay coil 67 after the set switch 64 is opened. The control valve 13 is energized and thereby opened by current from the battery 61 through the switch 62, contacts 66 and relay coil 67 to communicate the speed sensor 17 with the fluid source 12 and cause the system 11 to operate automatically in the manner described above. The vehicle operator may revert back to manual control by merely depressing the clutch pedal. This opens the switch 62 and de-energizes the relay coil 67 thereby opening the contacts 66. This interrupts the current flow to the control valve 13 which closes and blocks communication between the speed sensor 17 and the source 12. It will be seen that the relay coil 67 and contacts 66 constitute an opening means or a bistable latching relay which is set by closing the set switch 64 and reset by opening the clutch switch 62. The pilot lamp 68 is energized when the system 11 is in the automatic control mode thereby indicating the same.

The battery 61 further leads to ground through a normally open brake switch 71 and a brake lamp 72. The junction of the brake switch 71 and lamp 72 is connected to the anode of a diode 73, the cathode of which is connected to ground through a relay coil 74. The relay coil 74 serves to open the contacts 63 when energized.

The switch 71 is connected so as to be closed when the vehicle brake pedal (not shown) is manually depressed by the vehicle operator to brake the vehicle wheels. Closure of the switch 71 energizes the brake lamp 72 and also the relay coil 74 through the diode 73. This opens the relay contacts 63 thereby de-energizing the relay coil 67 and control valve 13 and resetting the system 11 to the manual operating mode. Thus, depression of either the vehicle brake or clutch pedal will de-energize the automatic control system and restore full manual control to the vehicle operator.

In accordance with an important feature of the present invention, a normally open exhaust brake valve 75 is provided in the vehicle exhaust manifold (not shown). The valve 75 is of the same type as the control valve 13 but is normally open and is closed upon electrical energization. This blocks the vehicle exhaust system and creates a back pressure which has a strong braking effect on the engine and vehicle when the clutch is engaged and the transmission is in drive. The valve 75 may be manually closed by the vehicle operator by means of a normally open exhaust brake switch 76 which is provided in the vehicle cabin. Rather than being connected directly between the battery 61 and the exhaust brake valve 75, the exhaust brake switch 76 is connected in series between the battery 61 and the anode of a diode 77. The cathode of the diode 77 is grounded through a drive switch 78, an idle switch 79 and the exhaust brake valve 75.

The drive switch 78 is actuated by suitable sensors (not shown) so as to be closed when the engine is drivingly connected to the vehicle wheels and opened when driving connection is broken by disengaging the clutch or placing the transmission in neutral. The drive switch 78 is provided to prevent application of the exhaust brake when the engine is not connected to the wheels since the brake would have no effect on the vehicle speed and might damage the engine.

The idle switch 79 is of the normally open type and is further illustrated in FIG. 1. An actuator member 80 is formed on the actuator rod 42 which is adapted to engage with an actuator 79a of the switch 79, the switch 79 being fixed in position and the rod 42 being movable relative thereto. The actuator member 80 engages with and closes the idle switch 79 when the actuator rod 42 and thereby the fuel control member 48 are in the idle or minimum fuel demand position.

Since blocking of the engine exhaust system with the engine producing a substantial amount of power may result in serious damage to the engine, the idle switch 79 is provided to allow the exhaust brake valve 75 to be closed only when the engine is producing minimum power or when the minimum amount of fuel is being supplied for combustion. With the exhaust system blocked under these conditions, the normal engine braking effect is increased to produce an effect comparable to downshifting the transmission by one reduction ratio. Thus, with the engine drivingly connected to the wheels and the minimum amount of fuel being introduced into the engine, closure of the exhaust brake switch 76 energizes the exhaust brake valve 75 through the switches 78 and 79 to apply a braking force to the vehicle which may utilized either alone or in combination with the wheel brakes.

The junction between the exhaust brake switch 76 and the diode 77 is connected to the anode of a diode 81, the cathode of which is connected to the cathode of the diode 73. Closure of the exhaust brake switch 76 will thereby energize the relay coil 74 and de-energize the automatic control system in the same manner as closure of the brake switch 71. However, the diode 73 prevents the brake lamp 72 from being energized. The diode 81 prevents the exhaust brake valve 75 from being closed when the brake switch 71 is closed. Since the energization of the exhaust brake valve 75 may occur only if the switches 78 and 79 are closed, it will be seen that exhaust brake switch 76 enables the exhaust brake valve 75 to be closed by the switches 78 and 79.

The junction of the relay coil 67 and control valve 13 is connected to the anode of a diode 82, the cathode of which is connected to the cathode of the diode 77 through a delay unit 83. In this manner, the voltage across the control valve 13 is applied to the switch 78 after the predetermined time delay of the delay unit 83 from the time the system 11 is placed in the automatic mode. The delay unit 83 prevents the exhaust brake valve 75 from being closed when the fuel control member 48 is in the idle position and the control valve 13 is closed to place the system in the automatic mode. Without the provision of the delay unut 83, the vehicle would not be able to accelerate from idle speed under automatic control due to exhaust braking.

The diode 77 prevents the relay coil 74 from being energized thereby closing the control valve 13 and terminating automatic control when the voltage across the control valve 13 is applied to the switch 78 through the diode 82. The diode 82 prevents the control valve 13 from being opened through closure of the exhaust brake switch 76 would erroneously place the system 11 in the automatic control mode as long as the switch 76 was closed.

The idle switch 79 is used in a novel and unique manner in the present invention to indicate when control of fuel alone is insufficient to prevent the vehicle speed from exceeding the predetermined value. In accordance with the basic operation of the system 11, the fuel control member 48 is moved toward the idling position as the vehicle speed exceeds the predetermined value to decelerate the vehicle to the predetermined value. However, if the vehicle is heavily loaded, moving down a steep grade and/or operating in overdrive, the engine braking provided by supplying the minimum amount of fuel into the engine may be insufficient to limit the vehicle speed to the predetermined value. Under these conditions, the fuel control member 48 will be moved to the minimum fuel demand or idling position by the system 11. The fact that the fuel control member 48 has been moved to this position indicates that the limit of vehicle speed control using fuel control alone has been reached or exceeded. Under these circumstances the idle switch 79 closes thereby closing the exhaust brake valve 75. While remaining in the automatic control mode, the vehicle is subjected to the combined braking effect of minimum fuel supply and exhaust braking thereby reducing the vehicle speed to the predetermined value. Due to the strong effect of exhaust braking as mentioned above, there are very few operating conditions of a practical motor vehicle under which this braking effect is insufficient to provide speed control, and the operating range of the system 11 is thereby considerably extended compared with similar prior art systems. If such an extreme case should occur, the operator may close the exhaust brake switch 76 to maintain the exhaust brake valve 75 closed and subsequently depress the brake pedal to close the brake switch 71 and apply the wheel brakes. In this case, complete control is returned to the vehicle operator who may employ the combination of minimum fuel supply, exhaust braking and wheel braking to decelerate the vehicle. It will be noted that automatic control is insufficient under only the most severe downgrade driving conditions in which the vehicle operator is generally given advance warning and will shift to manual control prior to entering such conditions. This is in sharp contrast to prior art systems in which only the fuel supply is automatically controlled.

Figure 3:
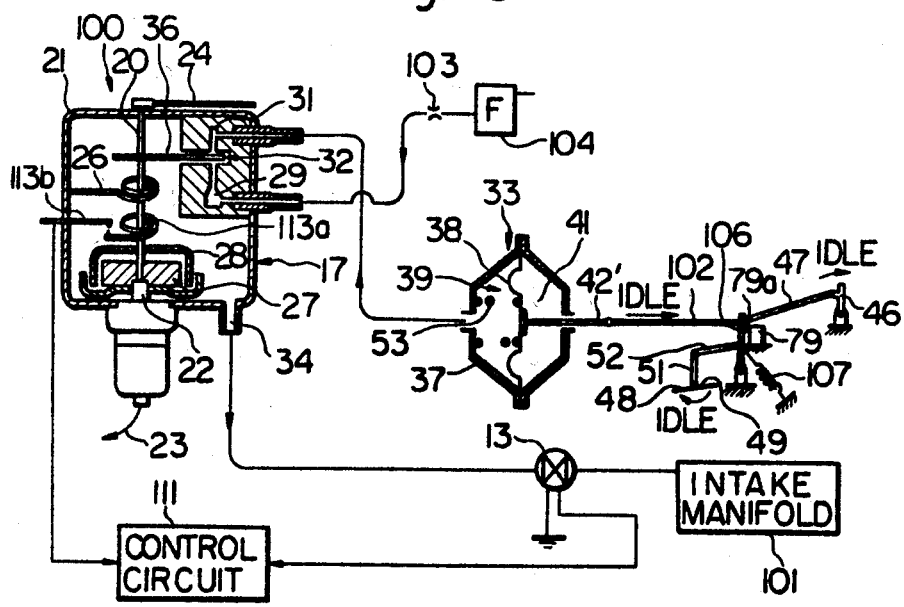
FIG. 3 is a diagrammatic view of a second embodiment of a vehicle speed control system according to the present invention.
Figure 4:
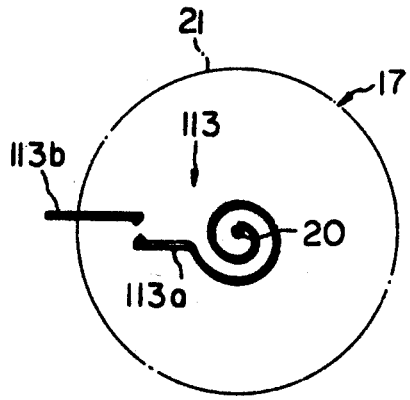
FIG. 4 is a plan view, to enlarged scale, of a speed sensor switch of the speed control system of FIG. 3.
Figure 5:
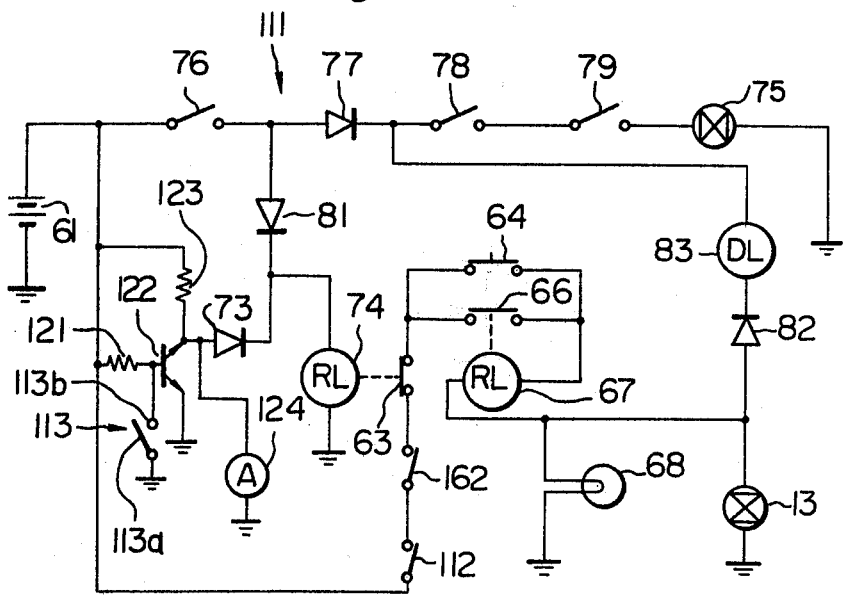
FIG. 5 is an electrical schematic diagram of a control circuit of the speed control system of FIG. 3.

FIGS. 3 to 5 illustrate a second embodiment 100 of the present invention which operates on the same principle as the previous embodiment. Due to this similarity, like reference numerals will be used to designate identical or essentially similar elements and only the points of difference between the embodiments will be discussed.

Whereas the speed sensor 17 is operated by positive pressure in the first embodiment, in the second embodiment it is operated by intake manifold vacuum. In this case the same speed sensor 17 is used but the outlet orifice 34 is connected to the engine intake manifold 101 through the control valve 13. The outlet orifice 31 is connected to the diaphragm assembly 33 and the inlet orifice 29 is communicated with the atmosphere through a flow restriction 103 and a filter 104. Whereas the same diaphragm assembly 33 may be used, the spring 53 is provided in the pressure chamber 39 urging the diaphragm 38 rightwardly.

The actuator rod in this embodiment is shorter than the actuator rod 42 and is designated as 42'. A flexible cable 102 connects the end of the actuator rod 42' to the upper end of a lever 106 which is pivotal about its lower end. The end of the arm 51 of the same fuel control member 48 is pivotally connected by the link 52 to the lever 106 at an intermediate point thereof. The accelerator pedal 46 is pivotally connected to the upper end of the lever 106 by the link 47.

In this embodiment the flow restriction 103 maintains the magnitude of vacuum at the inlet orifice 29 constant despite variations in intake manifold vacuum. The valve plate 36 controls the level of vacuum at the outlet orifice 31. The higher the vehicle speed in the automatic control mode the lower the vacuum in the outlet orifice 31 and pressure chamber 39. The spring 53 urges the diaphragm 38 rightwardly against the vacuum in the pressure chamber 39.

A tension spring 107 is provided to urge the lever 106 clockwise, the fuel control member 48 clockwise and the accelerator pedal 46 also clockwise to respective idling positions. The idle switch 79 is provided to the lever 106 to be closed thereby when the lever 106 is in the idling position.

The spring 107 constitutes a throttle return spring as is provided in conventional throttle linkages. The spring 53 urges the diaphragm 38 rightwardly toward the idling position thereof. The spring 107 urges the fuel control member 48 and accelerator pedal 46 toward their respective idling positions and acts in parallel with the spring 53 through the cable 102 to urge the diaphragm 38 rightwardly.

The system 100 may be operated manually by closing the control valve 13 as in the previous embodiment. The diaphragm 38 is moved rightwardly by the spring 53 to its idling position. Depression of the accelerator pedal 46 causes the fuel control member 48 to rotate counterclockwise thereby increasing the amount of fuel for combustion. During this operation, the cable 102 slackens.

With the control valve 13 open and the system 100 in the automatic control mode, an increase in vehicle speed above the predetermined value causes a decrease in the vacuum in the pressure chamber 39. The spring 53 urges the diaphragm 38 and cable 102 rightwardly, thereby reducing the force of opposition to the spring 107 which rotates the control member 48 clockwise to reduce the amount of fuel. A decrease in vehicle speed increases the vacuum in the pressure chamber 39 and moves the diaphragm 38 and cable 102 leftwardly against the force of the springs 53 and 107 in parallel. This rotates the fuel control member 48 counterclockwise to increase the amount of fuel for combustion. The operation of the system 100 in the automatic control mode is the same as the system 11 in that the predetermined vehicle speed is maintained. The major points of difference are that pressure is used in the system 11 whereas vacuum is used in the system 100 and that the fuel control linkages are different.

FIG. 5 illustrates a modified control circuit 111 of the system 100. In this embodiment a brake switch 112 is normally closed and is opened upon depression of the brake pedal. In addition, the brake switch 112 is connected in series with the clutch switch 62 rather than being connected to energize the relay coil 74. The relay coil 74 is energized by closure of the exhaust brake switch 76 to open the relay contacts 63 and de-energize the automatic control system. However, a speed sensor switch 113 is provided to energize the relay coil 74 through the diode 73 rather than the brake switch 71.

Figure 6:
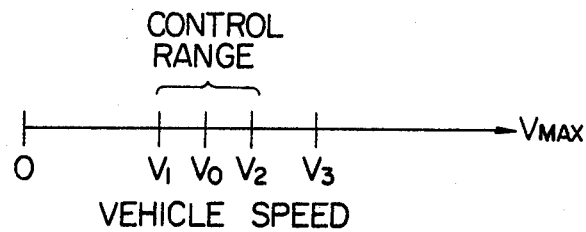
FIG. 6 is a diagram illustrating the speed control function of the system.

Referring to FIG. 6, the vehicle speed control operation of the system 100 is graphically illustrated. The system 100 is designed to maintain the vehicle speed at a predetermined value $V_0$ such as 50 mph, which is 5 mph below the current speed limit in the United States. The system will maintain the vehicle speed within a range $V_2$ and $V_1$ which are typically ± 5 mph of $V_0$ respectively, with $V_2$ having the value of 55 mph to ensure that the vehicle will not exceed the speed limit. At any time the vehicle exceeds the $V_2$ by, for example a value $V_3$ which is typically 5 mph above $V_2$, it is clear that the system should be under complete manual control of the vehicle operator for both statutory and safety reasons. The speed $V_3$ may be exceeded when the vehicle operator manually overrides the automatic control system to pass another vehicle or when the vehicle is rolling down a grade under automatic control which is so steep that the exhaust brake is insufficient to slow down the vehicle.

For this reason, the speed sensor switch 113 is provided to the speed sensor 17 as illustrated in FIGS. 3 to 5. The switch 113 comprises a movable contact 113a in the form of a hairspring which is fixed to the shaft 20 for unitary rotation and a fixed contact 113b which is rigidly supported by but electrically insulated from the casing 21. The casing 21, shaft 20 and thereby the movable contact 113a are electrically grounded.

The shaft 20 is designed to be angularly displaced in the clockwise direction against the force of the spring 26 as the vehicle speed increases. The spacing between the contacts 113a and 113b is selected so that the contacts 113a and 113b ohmically engage when the vehicle speed reaches $V_3$ and the shaft 20 is displaced clockwise by a corresponding amount. Due to the design of the movable contact 113a, the contact 113a will resiliently deform if the vehicle speed exceeds $V_3$ thereby allowing further clockwise rotation of the shaft 20.

As best seen in FIG. 5, the switch 113 is connected between the battery 61 and ground in series with a pull-up resistor 121. The junction of the resistor 121 and switch 113 is connected to the base of an NPN switching transistor 122, the emitter of which is grounded. The collector of the transistor 122 is connected to the battery 61 through a load resistor 123 and also to the anode of the diode 73. The collector of the transistor 122 is further connected to ground through an annunciator 124 such as a warning bell.

With the switch 113 open the transistor 122 is provided with a fixed forward bias by means of the pull-up resistor 121. The transistor is turned on and the collector voltage thereof is close to zero. The annunciator 124 is thereby de-energized. Furthermore, the low collector voltage of the transistor 122 applied to the anode of the diode 73 is insufficient to energize the relay coil 74.

However, when the vehicle speed exceeds $V_3$ and the switch 113 is closed, the base of the transistor 122 is grounded through the switch 113. With the removal of the forward bias the transistor 122 is turned off and the collector voltage thereof goes high. This high collector voltage is applied to the annunciator 124 to energize the same and warn the vehicle operator that the vehicle speed has exceeded $V_3$.

In addition, the high collector voltage of the transistor 122 is applied to the relay coil 74 through the diode 73 which energizes the relay coil 74 and opens the contacts 63. This action resets the system 100 and restores full manual control to the vehicle operator. It will be noted that with the control valve 13 closed, the spring 107 moves the fuel control member 48 to the idling position thereby automatically applying engine braking.

In summary, it will be seen that the automatic control range of a vehicle speed control system is substantially increased by incorporation of the exhaust brake feature which automatically applies the exhaust brake with the system in the automatic control mode when fuel control alone is insufficient to limit the vehicle speed to the predetermined value. Of course, the speed sensor switch 113 may be incorporated into the system 11 if desired, although not shown as such. Many other modifications will become possible for those skilled in the art after receiving the teachings of the present disclosure without departing from the scope thereof.

What is claimed is:

1. A vehicle speed control system comprising:
   a fuel control member;
   a fluid pressure source;
   a vehicle speed sensor arranged to modulate fluid pressure from the fluid pressure source to a value corresponding to sensed vehicle speed;
   an electrically actuated control valve connected between the fluid pressure source and the speed sensor;
   an actuator actuated by the speed sensor to control a position of the fuel control member in such a manner as to demand a predetermined vehicle speed, the actuator being actuated by the modulated fluid pressure from the speed sensor,
   operable means connected to the control valve to open the control valve thereby energizing the speed sensor and to close the control valve thereby de-energizing the speed sensor;
   an exhaust brake valve; and
   switch means connected to close the exhaust brake valve when the speed sensor is energized by the operable means and the fuel control member is moved to a minimum fuel demand position by the actuator.

2. A system as in claim 1, further comprising an exhaust brake switch to enable the switch means independently of the operable means.

3. A system as in claim 2, in which the exhaust brake switch is further connected to the operable means such that actuation of the exhaust brake switch causes the operable means to de-energize the speed sensor.

4. A vehicle speed control system comprising:
   a fuel control member;
   a fluid pressure source;
   a vehicle speed sensor arranged to modulate fluid pressure from the fluid pressure source to a value corresponding to sensed vehicle speed,
   an electrically actuated control valve connected between the fluid pressure source and the speed sensor;
   an actuator actuated by the speed sensor to control a position of the fuel control member in such a manner as to demand a predetermined vehicle speed, the actuator being actuated by the modulated fluid pressure from the speed sensor,
   bistable means connected to the control valve to open the control valve thereby energizing the speed sensor when the bistable means is set and close the control valve thereby de-energizing the speed sensor when the bistable means is reset;
   a set switch for setting the bistable means when actuated;
   a brake switch for resetting the bistable means when actuated;
   an exhaust brake valve; and switch means connected to close the exhaust brake valve when the speed sensor is energized and the fuel control member is moved to a minimum fuel demand position by the actuator, the switch means being enabled by the bistable means when the bistable means is set.

5. A system as in claim 4, further comprising an exhaust brake switch to enable the switch means independently of the bistable means when actuated.

6. A system as in claim 5, in which the exhaust brake switch is further connected to reset the bistable means when actuated.

7. A system as in claim 4, further comprising a speed sensor switch connected to reset the bistable means in response to a sensed vehicle speed which exceeds the predetermined vehicle speed by a predetermined amount.

8. A system as in claim 7, further comprising an annunciator connected to be energized when the bistable means is reset by the speed sensor switch.

9. A system as in claim 7, in which the speed sensor switch is provided to the speed sensor.

10. A system as in claim 4, in which the bistable means comprises a latching relay.

11. A system as in claim 4, in which the speed sensor comprises a vehicle driven rotary magnet, a magnetically conductive cup coaxially surrounding the magnet, a spring urging the cup to a rest position, a valve plate fixed to the cup for unitary rotation against the force of the spring due to eddy currents induced in the cup by rotation of the magnet, a fluid inlet orifice connected to the fluid pressure source and a fluid outlet orifice connected to the actuator, the valve plate being operatively disposed between the inlet and outlet orifices.

12. A system as in claim 4, in which the actuator comprises a diaphragm assembly.

13. A system as in claim 4, further comprising a manual speed control member connected to the fuel control member.

* * * * *